United States Patent [19]

Bahu

[11] Patent Number: 5,606,734
[45] Date of Patent: Feb. 25, 1997

[54] STRUCTURE GENERATED COMPOSITE REFERENCE SIGNAL FOR INTERFERENCE SUPPRESSION IN AN ADAPTIVE LOOP

[75] Inventor: Mark B. Bahu, Ventura, Calif.

[73] Assignee: American Nucleonics Corporation, Westlake Village, Calif.

[21] Appl. No.: 25,036

[22] Filed: Mar. 2, 1993

[51] Int. Cl.⁶ .................................... H04B 1/10
[52] U.S. Cl. .................. 455/303; 455/278.1; 455/296; 333/12
[58] Field of Search .................... 455/41, 278.1, 455/303–305, 295, 296, 297, 67.3, 226.1, 226.2, 226.3; 336/174, 195; 348/6, 12; 324/522, 524, 528, 529, 530; 333/12, 18, 18 R, 28, 28 R, 243–245

[56] References Cited

U.S. PATENT DOCUMENTS

| | | | |
|---|---|---|---|
| 3,699,444 | 10/1972 | Ghose et al. | 455/304 |
| 3,719,904 | 3/1973 | Bragg | 333/12 |
| 4,166,251 | 8/1979 | Ishigaki et al. | 455/303 |
| 4,648,127 | 3/1987 | Jongpier | 455/303 |
| 4,952,193 | 8/1990 | Talwar | 455/295 |
| 5,047,736 | 9/1991 | Ghose | 333/12 |

Primary Examiner—Reinhard J. Eisenzopf
Assistant Examiner—Thanh Le
Attorney, Agent, or Firm—Hoffmann & Baron

[57] ABSTRACT

A method is provided for obtaining a reference signal for suppressing an interfering signal received by a radio receiver system. The radio receiver system receives the interfering signal on an antenna along with a signal of interest. An electrically conducting structure on which is present an interfering signal corresponding to the interfering signal present on the antenna and close to the antenna is selected and the interfering signal present on the conducting surface is sampled to obtain a reference signal. The reference signal is provided to an interference cancellation system which generates a cancellation signal used to suppress the interfering signal received by the radio receiver system.

5 Claims, 9 Drawing Sheets

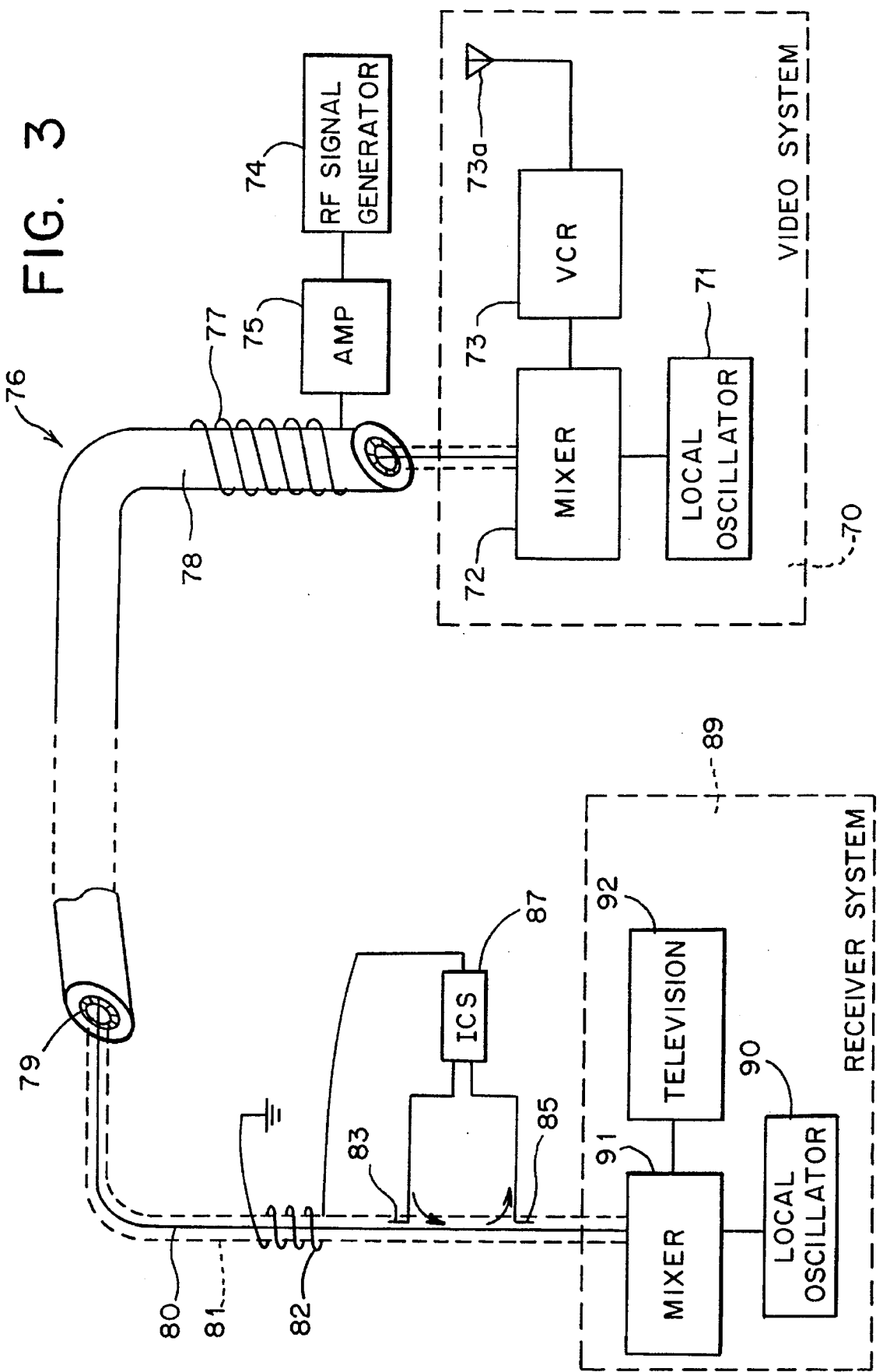

STRUCTURE GENERATED COMPOSITE REFERENCE SIGNAL FOR INTERFERENCE SUPPRESSION IN AN ADAPTIVE LOOP

BACKGROUND OF THE INVENTION

1. Field of the Invention

This invention relates to radio communication systems and methods, and more particularly, relates to interference canceling systems and methods for minimizing or eliminating interference in radio receivers due to unwanted signals. Even more specifically, this invention relates to a cancellation system capable of suppressing interference when conventional techniques are ineffective and access to interfering sources or multiple reference couplers and their associated cables are impractical because of complexity and weight.

2. Description of the Prior Art

Receiver operation within a radio communication system may be disrupted by interfering signals generated by collocated transmitters or remote transmitters radiating within the receiver passband. These interfering signals are received by a system receiving antenna and are present on a system receive line. A collocated source may interfere with the receiver due to the finite isolation between the transmit and receiving antennas. Separating the transmitter and receiver in order to increase the isolation is often times impossible due to physical constraints, such as in the case of an airborne platform. Interfering signals received from a remote transmitter at the receiving antenna which are stronger than the signal of interest will prevent the signal of interest from being detected. Conventional techniques such as filtering to remove the interfering signals when they are not closely distinguished in frequency from the signal of interest place unacceptable limitations on system frequency response. Interference cancellation systems solve such problems associated with both the remote and collocated transmitters.

An interference cancellation system takes a sample of an interfering signal for use as a sample reference signal and synchronously detects the presence, amplitude and phase of an interfering (undesired) signal on the system receive line. The system generates a cancellation signal which is adjusted in magnitude and phase such that the result is equal in amplitude and 180° out of phase with the interfering signal on the receive line. Theoretically, the vector sum of the two signals will cancel, leaving only the signal of interest as input to the receiver. A detailed explanation of the structure and workings of an interference cancellation system can be found in commonly owned U.S. Pat. No. 4,952,193 to Ashok Talwar, the disclosure of which is incorporated herein by reference.

FIG. 1 is a functional diagram of a conventional "N-channel" interference cancellation system 1 coupled to a radio receiver system, shown generally as including a receiving antenna 2, a receiver 4 and a receive transmission line 5, interconnecting the receiving antenna 2 and the receiver 4. The interference cancellation system is also coupled to three of N transmitters, not associated with the radio receiver system. Three transmitters 16, 18, 19, each output an energy signal for transmission by three associated antennas 8, 10, 12, electrically connected by antenna transmission lines 26, 28, 30, respectively. The energy signals transmitted from antennas 8, 10, 12 may be received by receiving antenna 2 and interfere with the operation of receiver 4. The interference cancellation system 1 samples the signals output by transmitters 16, 18, 19, thereby providing reference signals for use in canceling the interfering signals present on the receive transmission line 5.

A first, second and third coupler 20, 22, 24 (of N couplers) are coupled to antenna transmission lines 26, 28, 30, respectively. The couplers sample the signals, i.e., interfering signals, generated by transmitters 16, 18, 19, respectively, and generate corresponding reference signals on their outputs. Three signal controllers 32, 34, 36 are shown electrically connected to couplers 20, 22, 24, respectively, through transmission lines 21, 23, 25, respectively, for receiving the reference signals. Three synchronous detectors 38, 40, 42 are shown electrically connected to couplers 31, 33, 35, respectively. The couplers 31, 33, 35 sample the reference signals present on transmission lines 21, 23, 25, thereby providing a portion of the reference signal to the synchronous detectors.

A sampler coupler 44 samples the interfering signals present on receive transmission line 5. A power divider 45 provides a portion of the sampled interfering signals to each of synchronous detectors 38, 40, 42. Synchronous detectors 38, 40, 42 then compare the amplitude and phase of the sampled interfering signals present on the receive line 5 with the amplitude and phase of the reference signals sampled by couplers 20, 22, 24 (corresponding to transmitters 16, 18, 19). Based on the comparison, control signals are generated and output to signal controllers, 32, 34, 36.

Upon receipt of the control signals, signal controllers 32, 34, 36 generate cancellation signals which correspond, in effect, to the reference signals adjusted in phase and amplitude. The cancellation signals are injected into the receive line 5 via a power combiner 47 and summer coupler 46 in order to cancel or suppress the undesired interfering signals present there. Signal controllers 32, 34, 36 are continuously driven by the control signals from the synchronous detectors 38, 40, 42, thereby defining an adaptive control loop for automatically adjusting the amplitude and phase of the reference signals and generating corresponding cancellation signals. The reference signals used by the interference cancellation system for interference suppression are therefore derived from the couplers installed in the transmit line of each of the interfering sources (or from an auxiliary antenna in the case of a remote transmitter).

The conventional "N-channel" interference cancellation system shown in FIG. 1 requires an adaptive control loop for cancelling the interference generated by each interfering source. Each adaptive control loop requires a separate coupler to sample each interfering source. Multiple couplers and adaptive control loops may impose unacceptable weight and complexity requirements for many applications. For example, an airborne platform having N interfering on-board sources, such as switching power supplies, computer buses, etc., collocated with a receiving antenna would require at least a coupler, detector and signal controller for each interfering source. The added elements corresponding to each interfering source burden the airborne platform with additional weight.

Problems of complexity result from the need to coordinate the multiple adaptive loops required for multiple interfering sources. For example, a cancellation signal corresponding to each source of interference must be injected into the receive line. The amplitude, phase and time match between the adjusted reference signal (i.e., the cancellation signal) and the interfering signal present on the receive line must be such that the interfering signal present on the receive line is canceled. In addition to problems of complexity, often times a receiver is so remote from an operating station that access to the receiver is impossible thereby rendering it functionally impossible to derive an reference signal.

OBJECTS AND SUMMARY OF THE INVENTION

It is therefore an object of the present invention to provide an apparatus and method for obtaining a reference signal for suppressing an interfering signal received by a radio receiver system whereby an interfering signal present on a conducting structure associated with the radio receiver system is sampled to derive the reference signal.

It is another object of the present invention to provide an apparatus and method for obtaining a reference signal for suppressing an interfering signal received by a radio receiver system which overcomes the need to sample each interfering signal at the interfering source, as is the case of a conventional interference cancellation system.

It is a further object of the present invention to provide an apparatus and method for obtaining a reference signal for suppressing an interfering signal received by a radio receiver system in which the need for access to an interfering source providing each interfering signal to obtain a reference signal is minimized.

It is yet a further object of the present invention to provide an interference cancellation apparatus and method for suppressing an interfering signal received by a radio receiver system including a radio receiver and a receive transmission line in which a reference signal corresponding to the interfering signal is obtained from a cable shielding of the receive transmission line of the radio receiver system.

It is still another object of the present invention to provide an interference cancellation system and method for suppressing an interfering signal received by a radio receiver system including a radio receiver and a receive transmission line by obtaining a reference signal corresponding to the interfering signal from one of a conducting structure and surface associated with the radio receiver system and providing the reference signal to the interference cancellation system for canceling the interfering signal present on the receive transmission line.

It is yet another object of the present invention to provide a simple and efficient method for obtaining a reference signal for use in a cancellation system.

In one form of the invention, a method for obtaining a reference signal for suppressing an interfering signal received by a radio receiver system includes the steps of locating an electrically conducting surface on which the interfering signal is present, and sampling the interfering sample present on the conducting surface to obtain the reference signal corresponding thereto. Preferably, the interfering signal present on the conducting surface is inductively sampled to obtain the reference signal.

It has been found that an electrically conducting surface, often times situated in close proximity to a receiving antenna of a radio receiver system, may be an appropriate source for sampling one or more interfering signals which have been radiated onto or conducted through the electrically conducting surface. An ideal reference would contain the sum of multiple interference signals but would not contain a significant amount of the signal of interest. The reference would have an interfering signal amplitude greater than that of the interfering signal received by the receiving antenna. It has been found that, often times, an electrically conducting surface exposed to radiated interfering signals carries a sum signal of the multiple interfering signals. The sum signals may be sampled by using an inductive coupler or the like to provide a more exact reference signal for use in an interference cancellation system.

Another form of the present invention is directed to an interference cancellation system for canceling an interfering signal received by a radio receiver system. The radio receiver system includes a radio receiver, a receiving antenna and a receive transmission line for coupling the receiving antenna to the receiver, and has associated with it an electrically conducting structure on which an interfering signal is present. In accordance with the present invention, the interference cancellation system includes a coupler coupled to the conducting structure for sampling the interfering signal present on the conducting structure and for generating a reference signal, a signal controller responsive to the reference signal, a synchronous detector responsive to the reference signal and generating a control signal in response thereto, the signal controller being responsive to the control signal and generating a cancellation signal, a summer coupler coupled to the signal controller and injecting the cancellation signal into the receive transmission line and a sampler coupler electrically coupled to the receive transmission line and generating an error signal corresponding to the interfering signal and desired signal on the receive transmission line, the synchronous detector receiving the error signal and generating the control signal in response to the error and reference signals.

The coupling means samples the interfering signal present on the conducting surface which corresponds to an interfering signal present on the receive transmission line and provides a portion as a reference signal to the synchronous detector and the signal controller. The sampler coupler samples a signal present on the receive transmission line and provides a portion of the received signal to the synchronous detector. The synchronous detector compares the reference signal and the received signal and generates a control signal as input to the signal controller is response thereto. The signal controller responds to the control signal by adjusting the phase and amplitude of the reference signal and generating a cancellation signal corresponding thereto, and injecting the cancellation signal onto the receive transmission line to cancel the interfering signal present there.

In accordance with yet another form of the present invention, an apparatus for obtaining a reference signal for suppressing an interfering signal received by a receiving antenna of a radio receiver system includes an electrically conducting surface in proximity to the receiving antenna whereon an interfering signal is present corresponding to the interfering signal received by the receiving antenna. The apparatus has a reference signal sensor with a first layer of an insulating material positioned adjacent to the electrically conducting surface. Situated adjacent to the first layer of insulating material is a thin foil loop, which acts as an inductive coupler for generating a reference signal from the interfering signal present on the conducting surface, and a second layer of protective material situated adjacent to the foil loop. The second layer of protective material provides protection to the reference sensor from the environment.

These and other objects, features and advantages of this invention will become apparent from the following detailed description of illustrative embodiments thereof, which is to be read in conjunction with the accompanying drawings.

BRIEF DESCRIPTION OF THE DRAWINGS

FIG. 3 is a functional block diagram of a test setup used to test the feasibility of the present invention.

DETAILED DESCRIPTION OF THE PREFERRED EMBODIMENTS

Figure 2:
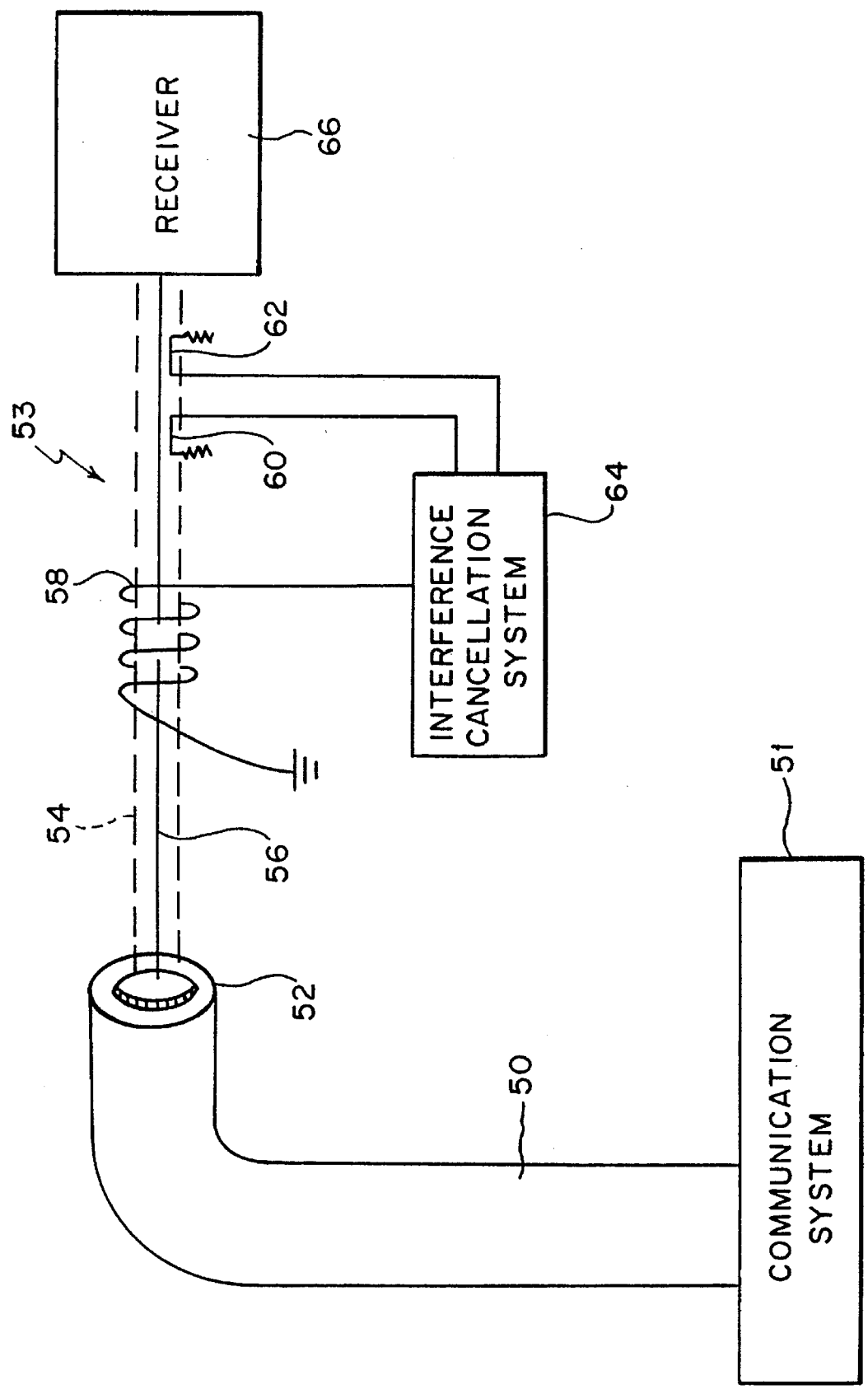
FIG. 2 is a functional block diagram of one embodiment of the present invention for obtaining a reference signal for interference suppression from an electrically conducting structure.

FIG. 2 illustrates functionally one embodiment of the present invention for obtaining a composite reference signal for interference suppression, in combination with an interference cancellation system. The figure shows a receiver 66 electrically connected to a communication system 51 through a transmission line 53. Transmission line 53 resides within a cable structure 50 having an outer cover 52 enclosing the transmission line 53 and any other cables required by the receiver system. The cable structure 50 acts as an antenna such that it may receive interfering energy signals within a broad band generated by signal sources radiating towards it along its length. The interfering energy signals received are summed by the cable structure to define a composite interfering signal.

The composite interfering signal present within the cable structure 50 is coupled onto an outer shield 54 of transmission line 53. The insulating property of the outer shield 54 is not adequate to sufficiently isolate a center conductor 56 from the composite interfering signal so that a portion of the composite interfering signal is coupled onto the center conductor 56.

Interfering signal sources may radiate signal energy into the cable structure 50 at different positions along the structure's length. Accordingly, a conventional signal derived from sampling each interfering source along the cable structure length and summing them at the receiver 66 would not adequately represent the composite signal seen at receiver 66. An ideal reference is a composite signal formed of a sum of the multiple interference signals radiated into cable structure 50 positioned as close to the receiver 66 as possible, excluding a significant amount of the signal of interest. The ideal composite reference signal also would have a signal amplitude greater than the amplitude of the interfering signal seen at receiver 66.

FIG. 2 also shows an interference cancellation system 64 utilizing the antenna-like and signal-summing properties of the cable structure 50 to generate a composite reference signal for interference suppression. A coupling means 58 couples a sample of the signal present on the outer shield 54 of transmission line 53 into the interference cancellation system 64 as a reference signal. A sampler coupler 60 samples the interfering signal present on center conductor 56 providing an error signal corresponding thereto as a second input to interference cancellation system 64. The interference cancellation system 64 compares the two signals and accordingly adjusts the reference signal to generate a cancellation signal corresponding thereto, which cancellation signal is of equal magnitude and 180° out of phase with the interfering signal on center conductor 56.

A summer coupler 62 injects the cancellation signal from the interference cancellation system 64 onto the center conductor 56. The cancellation signal cancels or suppresses the interfering signal present on the center conductor 56. The configuration of the present invention as shown in FIG. 2 is advantageous in that it does not require the addition of large delay lines to time match the reference signals to the interfering signals present on the receive line at the summation point to cancel the interfering signal present there.

FIG. 3 shows a test setup of the above-described embodiment. The test setup includes a television (TV) video system 70 electrically coupled to a receiver system 89 through a transmission line 79. Transmission line 79 is positioned within a cable structure 76 having an outer covering 78. The outer covering 78 of the cable structure 76 may be a Kevlar™ coating or the like. A number of cables may be contained within the cable structure 76, such as AC power cables, in addition to transmission line 79. The video system 70 includes a signal receiving antenna 73a, a video cassette recorder (VCR) 73 connected at one end to antenna 73a, a mixer 72 connected to VCR 73 to mix the received TV signal with a carrier signal provided by a local oscillator 71 in order to retransmit the TV signal to receiver system 89.

Receiver system 89 receives the TV signal (video and audio) transmitted from video system 70. Receiver system 89 includes a mixer 91 and a local oscillator 90 to receive and demodulate the TV signal, and a television 92 for displaying the video data contained within the TV signal to a user.

A quarter wavelength (¼λ) antenna 77 is shown wrapped around the outer conductive shielding 78. The antenna 77 is used to couple an RF interfering signal from an RF signal generator 74 through amplifier 75 into the cable structure 76. The coupled RF signal energy is used within the test setup to simulate extraneous interfering signal energy to which a cable structure 76 such as the one depicted herein may be subjected to during normal systems operation.

The simulated interfering signal energy is coupled through the cable structure onto the outer conductive shield 81 of transmission line 79. Because the outer conductive shield 81 is not adequate to sufficiently isolate the center conductor 80 from the interfering signal energy present on the shield 81, the interfering signal energy is also present on center conductor 80. A coupling means 82, such as an inductive pickup coil, preferably positioned close to receiver system 89, samples the interfering signal (from generator 74) present within the cable structure 76 on outer conductive shield 81 of transmission line 79. The power level of the interfering signal present on center conductor 80 is between 10 and 40 dB below the power of the interfering signal sampled from conductive shield 81 through coupling means 82.

Coupling means 82 generates a reference signal corresponding to the sampled interfering signal present on shield 81 and provides the reference signal to interference cancellation system 87. A summer coupler 85 and a sampler coupler 83 are also coupled at center conductor 80 to interference cancellation system 87. The sampler coupler 83 samples the signals (desired and interfering) on the center conductor 80 and generates an error signal corresponding thereto. The error signal is provided to the interference cancellation system 87 from the sampler coupler 83 which is preferably positioned close to receiver system 89. The error signal from sampler coupler 83 is then compared by the interference cancellation system with the reference signal from coupling means 82, and generates in a conventional manner a cancellation signal corresponding to the reference signal adjusted in phase and amplitude. More specifically, the amplitude of the cancellation signal is matched and its phase is shifted 180° with respect to the interfering signal present on the center conductor 80. The interference cancellation system 87 injects the cancellation signal onto inner conductor 80 through summer coupler 83 thereby canceling or suppressing the interfering signal present there.

Figure 4A:
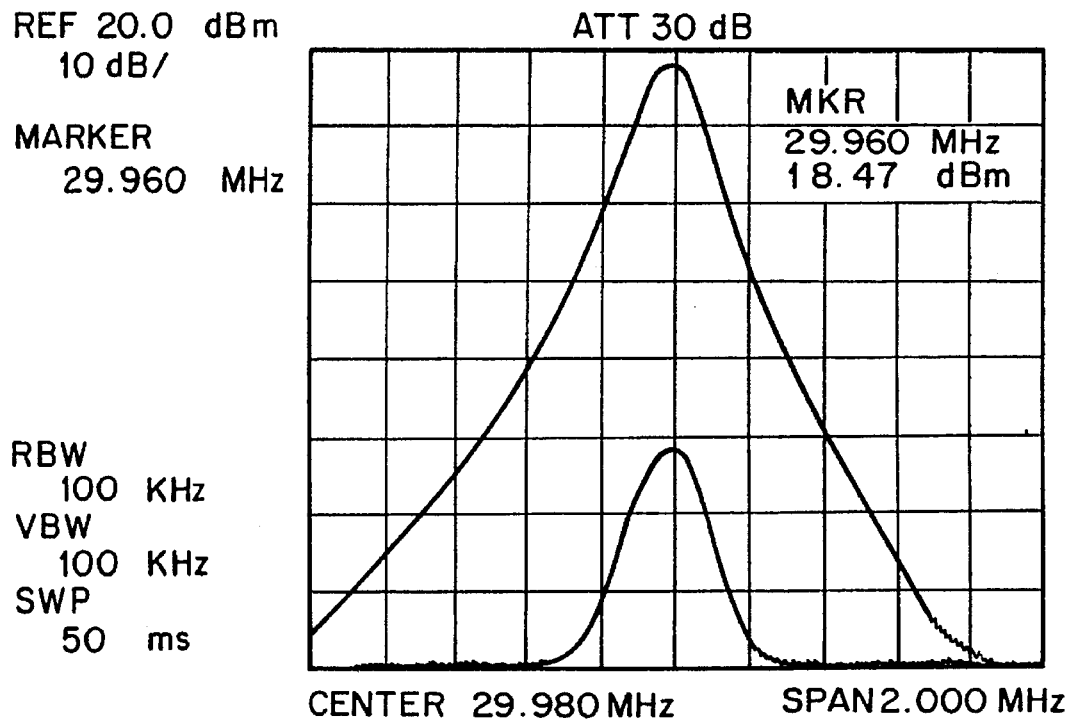
FIGS. 4A, 4B and 4C show spectrum analyzer plots of signal magnitude versus frequency for capacitive, indirect and direct inductive signal coupling used with the test setup of FIG. 3.
Figure 4B:
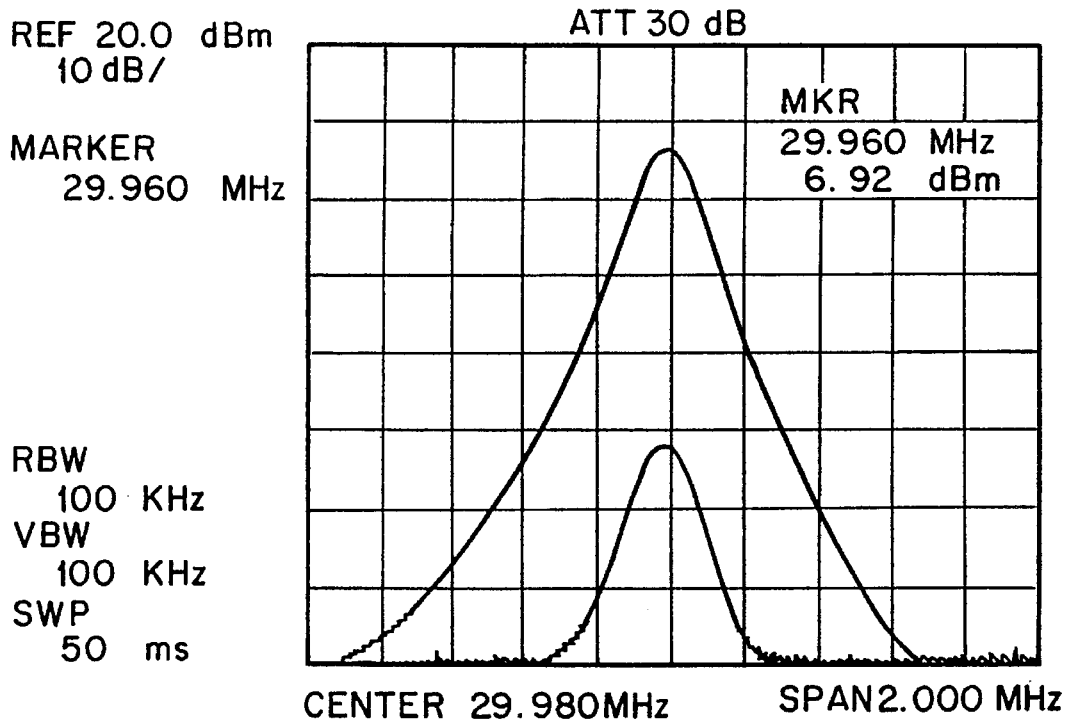
Figure 4C:
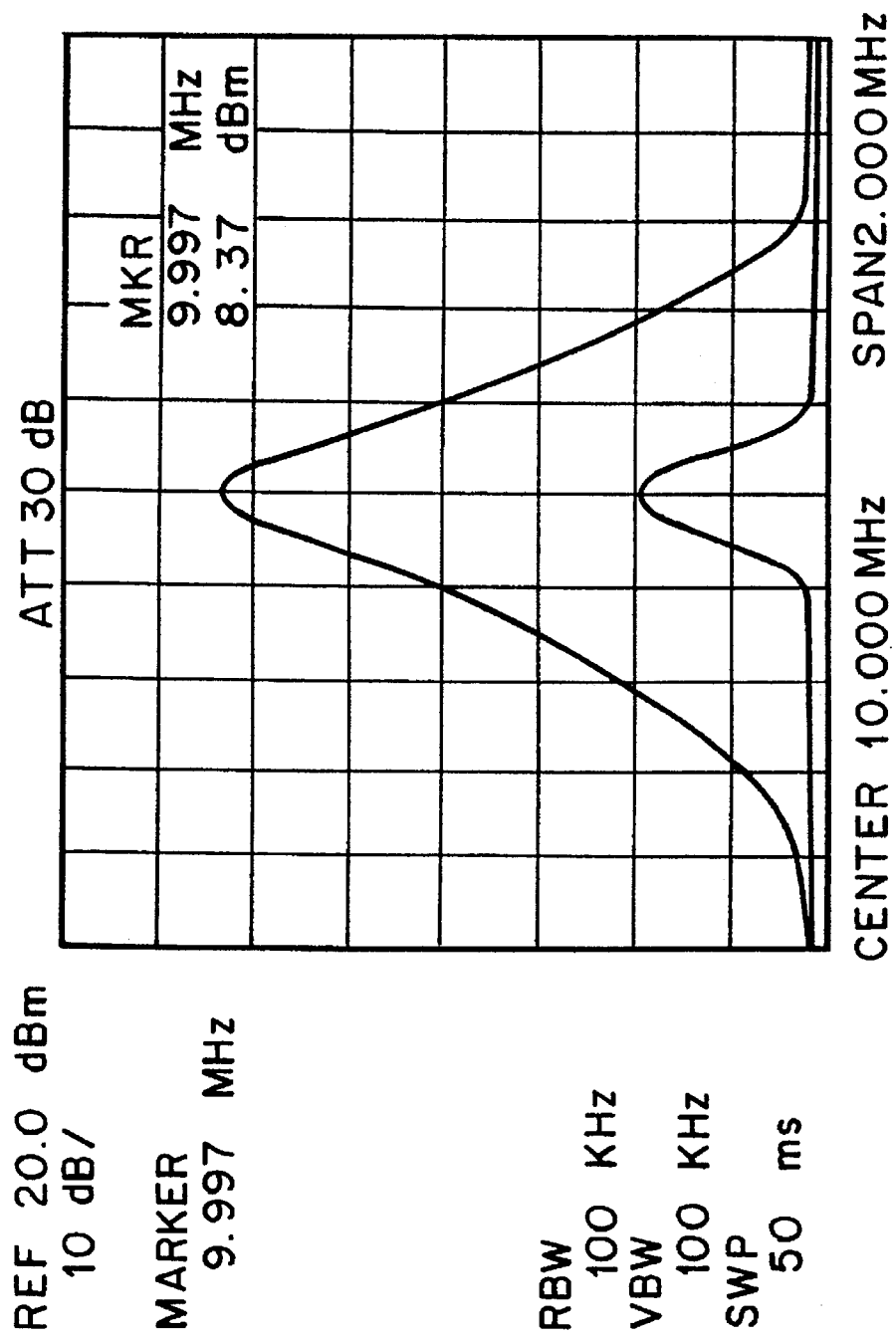

Three approaches were taken using the above-described test setup for coupling the interference reference signal present within cable structure 76 into the interference cancellation system 87 (i.e., three embodiments of coupling means 82). These three approaches entailed the use of capacitive, direct inductive and indirect inductive coupling means, respectively. Each coupling means tested provided excellent isolation between conductive shield 81 and the center conductor 80 of transmission line 79. The isolation established the necessary margin between the interfering signal sampled from outer shield 81 and the interfering signal present on center conductor 80 to allow interference suppression. The results of the different coupling methods are depicted in FIGS. 4A, 4B and 4C, respectively.

Capacitive coupling was improvised by simply coupling the signal energy present on conductive shield 81 into interference cancellation system 87 using an appropriately sized capacitor (not shown). FIG. 4A shows a spectrum analyzer plot of the interfering signal seen on conductive shield 81 and the interfering signal seen on the center conductor 80, a difference of almost 50 dB.

Direct inductive coupling was improvised by simply wrapping or looping a coil of wire around the outer shield 81 of transmission line 79. FIG. 4B shows a spectrum analyzer plot of the interfering signal seen at shield 81 and the interfering signal seen on center conductor 80, which is approximately 40 dB less than that at shield 81.

Indirect inductive coupling was accomplished by wrapping or looping a wire around outer shield 81 to couple the interfering signal present there into the primary of a transformer (not shown) having a ferrite core. The transformer secondary was provided with a winding such that the transformer coupling ratio was around 20:1 as seen from the secondary. FIG. 4C shows a spectrum analyzer plot of the interfering signal seen on conductive shield 81 and the interference signal seen on center conductor 80, which is approximately 42 dB less than the interfering signal on shield 81.

The operational results of the above-described test setup using direct inductive coupling is as follows.

The VCR 73 received a local TV signal (audio and video) via the antenna 73a. The received TV signal was used as the signal of interest for the receiver system 89. The received TV signal was modified and retransmitted onto transmission line 79. A simulated interfering signal was generated by RF signal generator 74, amplified by amplifier 75, and radiated into cable structure 76 via quarter wavelength (¼λ) coupling means 77. The frequency of the interfering signal was chosen to jam both the audio and video portion of the TV signal. The video and audio of the TV signal as seen by television 92 were completely jammed by the simulated interfering signal.

When activated, interference cancellation system 87 sampled the simulated interfering signal present on outer shield 81 of transmission line 79 through coupling means 82 to generate a reference signal corresponding thereto. The interference cancellation system 87 concurrently sampled the interfering signal seen by receiver system 89 present on center conductor 80 via sampler coupler 83 to generate an error signal corresponding thereto. Based on a comparison of the reference and error signals, the interference cancellation system 87 generated a cancellation signal adjusted in phase and amplitude so that it was of equal amplitude and 180° out of phase with the interfering signal seen by the receiver system. The interference cancellation system 87 injected the cancellation signal onto center conductor 80 through summer coupler 85 thereby substantially canceling the interference present there.

Figure 5:
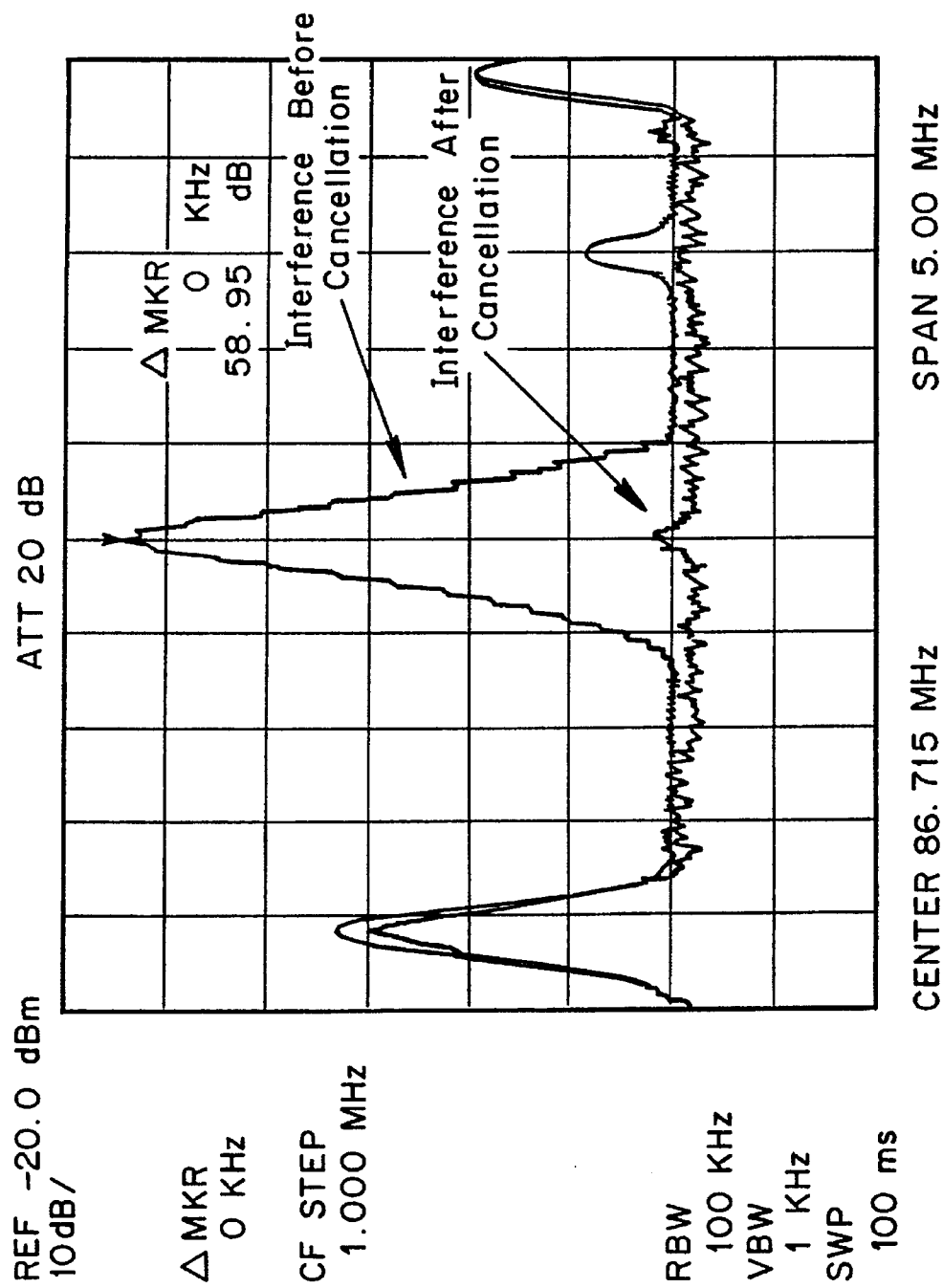
FIG. 5 shows a spectrum analyzer plot of the results of the interference suppression using the test setup of FIG. 3.

FIG. 5 shows a spectrum analyzer plot of the interfering signal present on center conductor 80 both before and after activation of the interference cancellation system 87 above described. Also shown are the video and audio signals at the left and right of the figure. Upon activation, the ICS 87 restored to normal the video and audio signals seen by television 92 by removing the interfering signal only. The simultaneous spectrum analyzer plot (FIG. 5) shows that approximately 55 dB of interference suppression was accomplished using the present invention.

Figure 6:
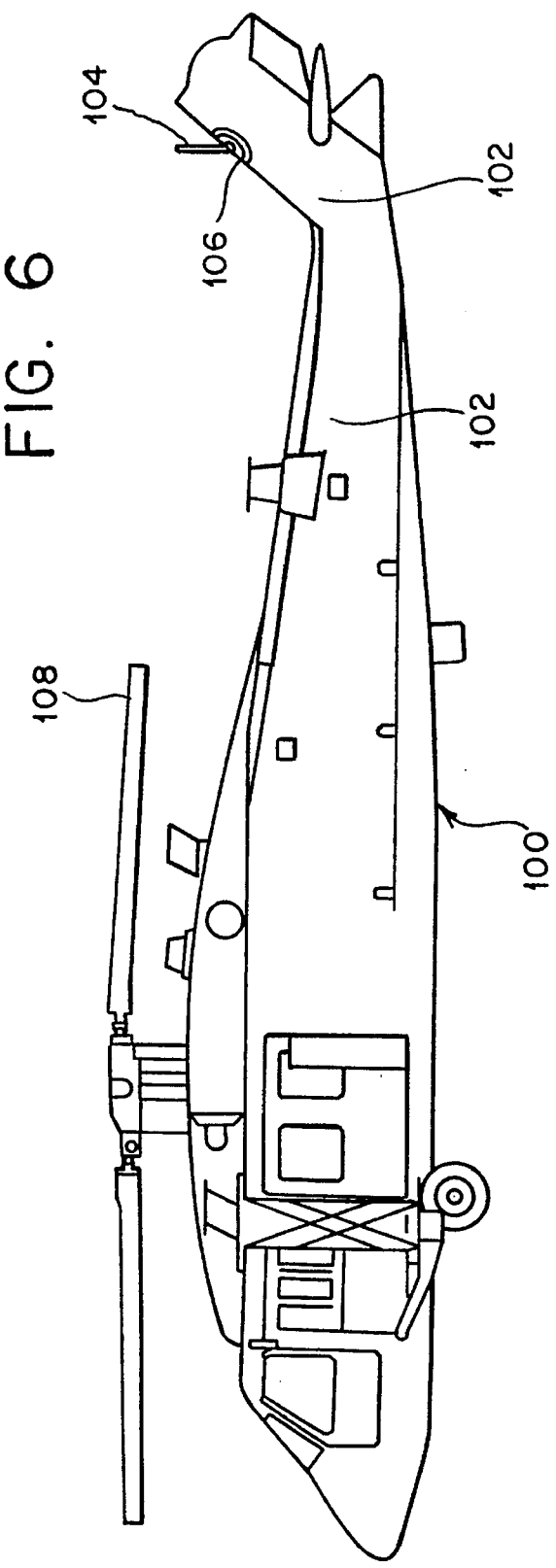
FIG. 6 is a side view of a helicopter in which another embodiment of the present invention is implemented.
Figure 7:
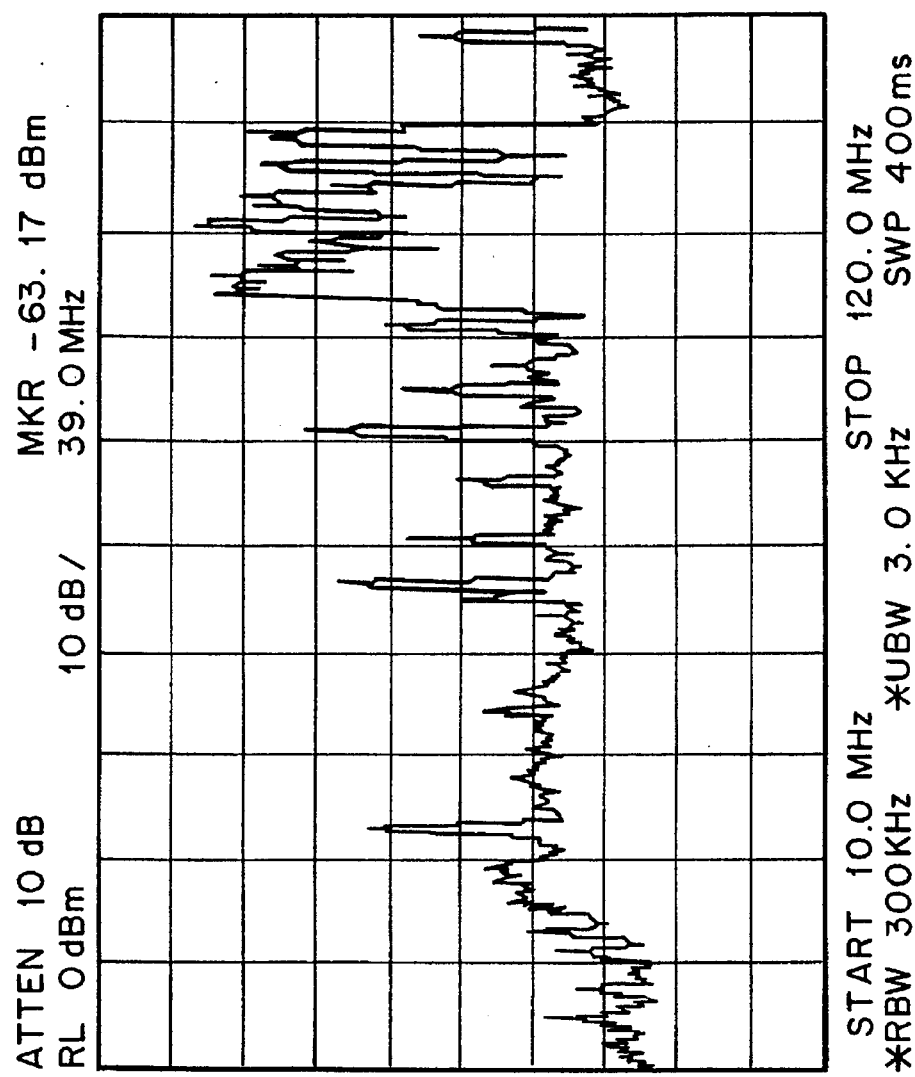
FIG. 7 depicts a spectrum analyzer plot of an RF environment of a helicopter skin.

FIG. 6 shows another embodiment of the present invention as used with an airborne platform. In the figure, a helicopter 100 is shown having a receiving antenna 104 mounted aft. The receiving antenna 104 is connected to a receiver (not shown) through a receive line (not shown) for receiving communication signals. An example of the RF environment as seen at the receiving antenna 104 with all helicopter systems shutdown, i.e., environmental background noise, is shown in the spectrum analyzer plot of FIG. 7. The receiving antenna 104, however, may also pick up extraneous energy signals generated by systems operating within the helicopter 100. In particular, the receiver may be jammed by noise (interfering signal energy) generated by on board noise generating systems, i.e., power supplies, digital logic and avionic systems radiated and picked up by the receiving antenna 104.

Figure 1:
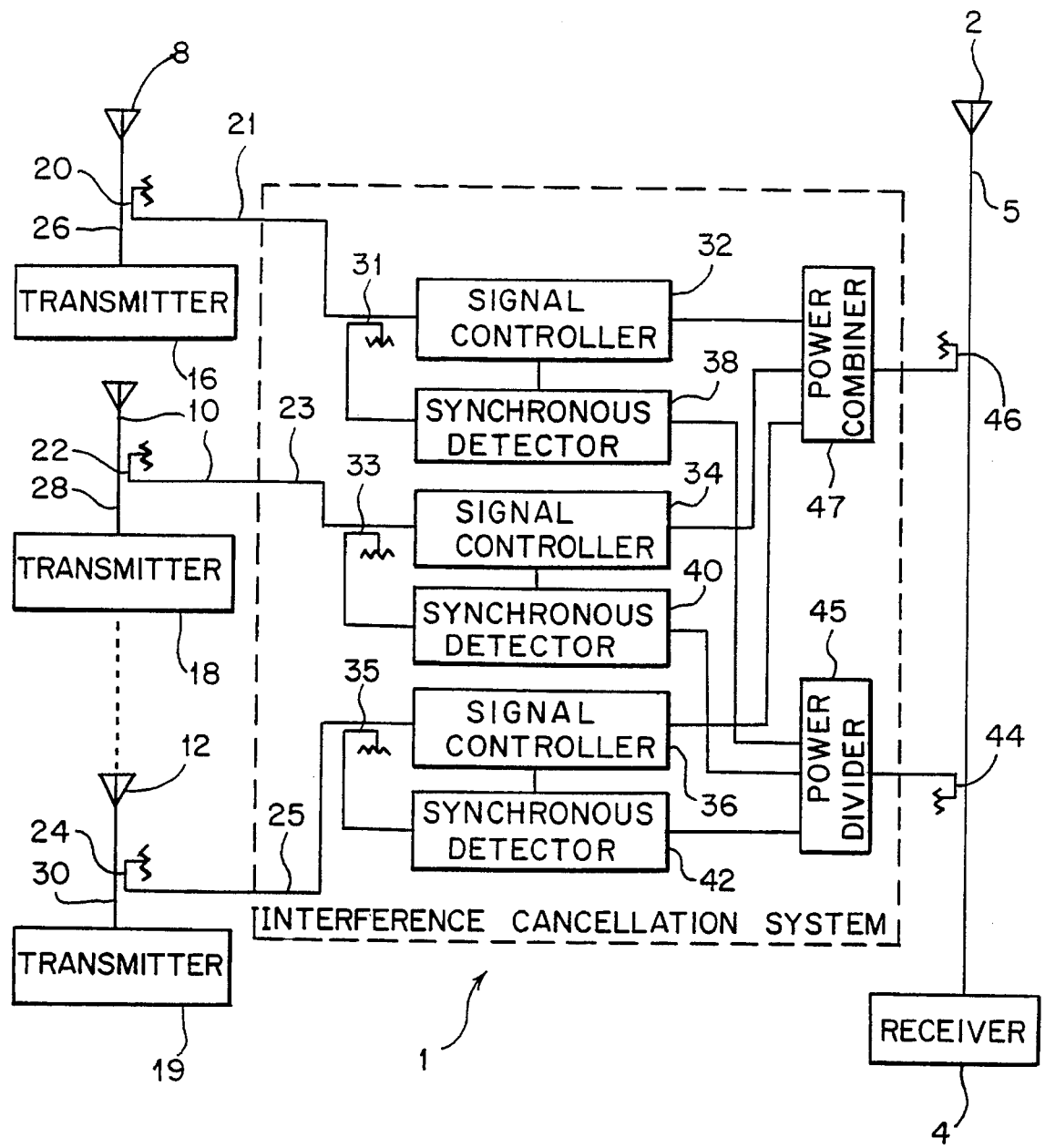
FIG. 1 is a functional block diagram of N signal transmitting sources electrically coupled to a conventional "N-channel" interference cancellation system (ICS), the ICS electrically coupled to a radio receiver system.

The electrically conductive skin 102 of the helicopter 100 is a conducting structure which also contains the signal energy and noise generated by on-board systems. The skin 102 is therefore a source for obtaining an accurate reference signal for interference suppression, as it carries a true representation of the composite interfering signal (i.e., the noise environment) with any harmonics of the interfering signals generated by the helicopter structure, for example, the rotor blades. Stated another way, the composite interfering signal residing in the conductive skin 102 of the helicopter is a better choice for sampling for obtaining a reference signal than by using individual couplers to sample each possible interference source, as the conductive skin 102 has on it the sum of all of the interfering signals and harmonics, as seen by the receive antenna, whereas in the conventional method, a plurality of reference signals is needed for use in an N-channel interference cancellation system, such as shown in FIG. 1, each reference signal being generated by directly sampling the interference source, and therefore the "composite" reference signal which the conventional N-channel interference cancellation system uses in generating the cancellation signal is an artificial creation and not a true representation of the noise environment to which the receiving antenna is exposed.

An inductive coupling loop 106 is used to sample the interfering signal energy present on the conducting structure, i.e., helicopter skin 102, to provide a reference signal to an on-board interference cancellation system (not shown). The inductive coupling loop 106 is preferably formed and placed on the skin 102 of the helicopter 100 at the base of the receiving antenna 104 where it samples a composite interfering signal present there to generate a reference signal. The reference signal is used by the interference cancellation system in generating a cancellation signal for canceling the interfering signals seen at the receiving antenna 104.

The purpose of placing the loop 106 at the base of the antenna 104 is to pick up the interfering signals at the conducting skin 102 as close as possible to receiving antenna 104. Placement thereof provides for more accurate correlation between the composite reference signal and the composite interfering signal received by the antenna 104. A composite of the interfering signals seen at the receiving antenna 104 may not be the same as the sum of those signals radiated from the different source points along the structure surface, i.e., different source points along the helicopter skin 102. Accordingly, as mentioned previously, the reference signal obtained from the conducting skin 102 near the receiving antenna 104 may be a more accurate representation of the interfering signal environment that the receiving antenna 104 is exposed to than by sampling individual interfering signals at their sources.

Figure 8:
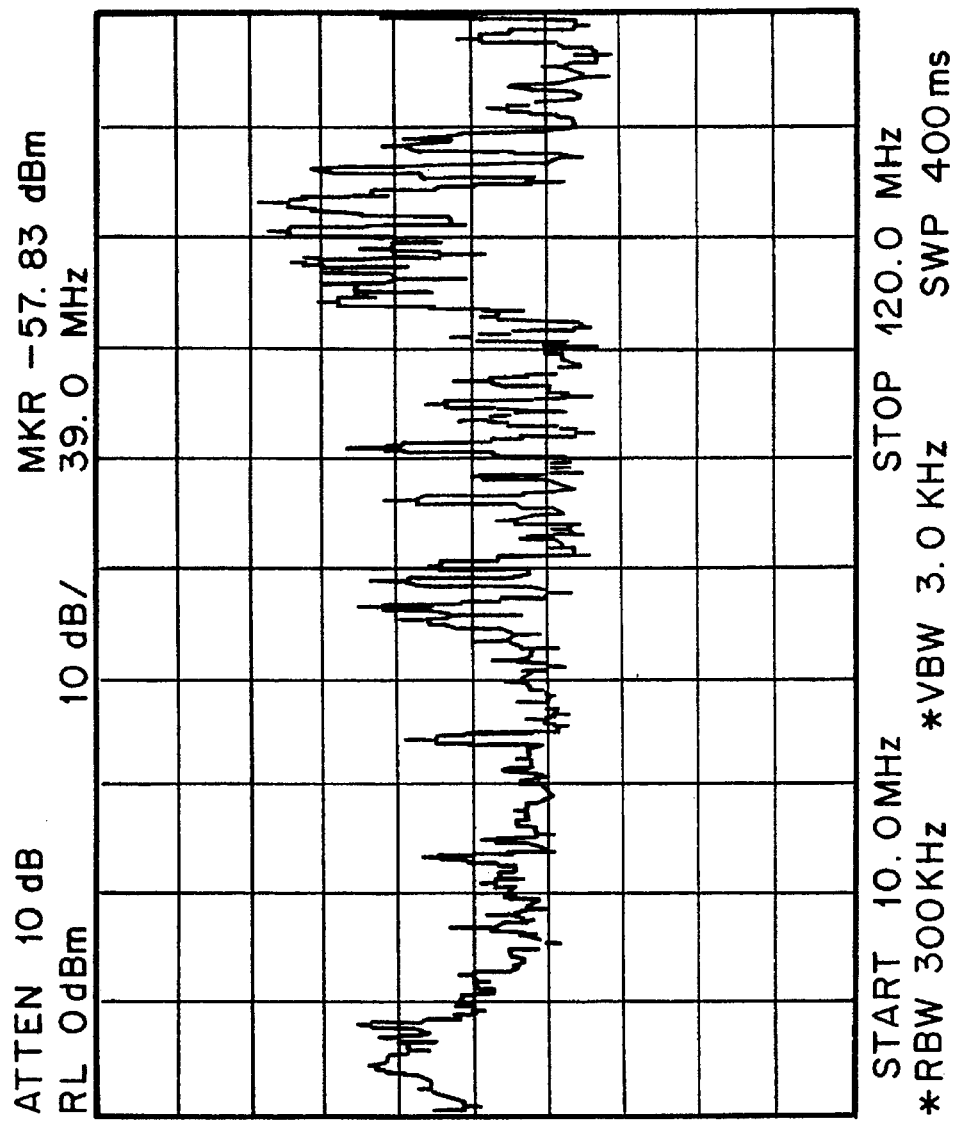
FIG. 8 depicts a spectrum analyzer plot of an RF environment as seen by an antenna mounted on the helicopter skin.

The level of broadband noise coupled into coupling loop 106 is approximately 10 dB larger than the noise seen in the receiving antenna 104. This power level difference is depicted in the spectrum analyzer plot of FIG. 8. In other words, the receiving antenna 104 sees a smaller composite interfering signal than the same interfering signal present on the helicopter skin 102. Also, the desired or communication signals present in the ambient environment are approximately 10 to about 20 dB lower in the output of the coupling loop 106 than in the receiving antenna 104, as can be seen by comparing FIGS. 7 and 8. Thus, the conductive skin 102 of the helicopter 100 is an excellent source for sampling the composite interfering signal and for generating a reference signal therefrom. The use of couplers at the numerous individual sources of noise aboard the helicopter 100 would be impractical due to the number of interfering sources and the added weight associated with their required couplers and cables.

The signal received from receiving antenna 104 is sampled at one point along a receive line (not shown) to generate an error signal which is provided to the on-board interference cancellation system. The interference cancellation system compares phase and magnitude of the reference signal which corresponds to the interfering signal sampled from the helicopter skin 102 and that of the error signal. Based on the comparison, the interference cancellation system generates a cancellation signal which is adjusted in amplitude and phase so that it is of equal amplitude and 180° out of phase with the signal on the receive line. The cancellation signal is then injected into the receive line to cancel or suppress the interfering signal present there.

Figure 6A:
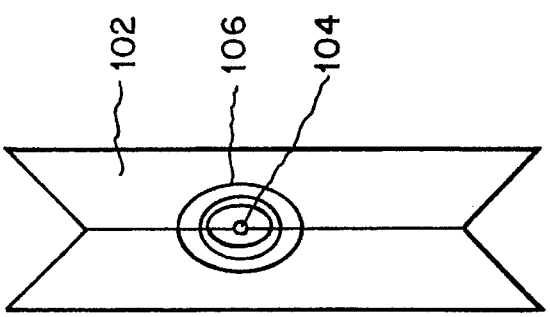
FIG. 6a is a top perspective view of an antenna and coupling means used in the embodiment described with reference to FIG. 6.

The inductive coupling loop 106 (FIG. 6a) may be implemented by creating an insulating layer of paint on the helicopter skin 102 at the base of receiving antenna 104 and cementing a thin foil loop to the insulating (paint) layer. The method of forming the loop is not limited, however, to an insulating layer upon which a foil loop is impressed. Any technique for forming a lightweight conductive sensor known to those skilled in the art, such as conductive loop 106, may be implemented without exceeding the scope of the present invention. An external layer of paint may be applied over the sensor for environmental protection after affixation of the sensor.

As can be seen from the preceding description, the method of the present invention is advantageous in that only a single source, i.e., the conducting structure in which a composite signal of the interfering signals resides, need be sampled to obtain a reference signal suitable for use in an interference cancellation system for interference suppression. The reference signal will be a more accurate representation of the interference which the receiver is exposed to than the reference signals sampled at the various interfering signal sources in a conventional system. With the method of the present invention, the structure of the interference cancellation system is simplified and its weight is reduced. Additionally, a greater and more accurate suppression of the interference in the receiver system will result with the method and apparatus of the present invention.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

We claim:

1. An interference cancellation system for canceling a plurality of interfering signals received by a radio receiver system, the radio receiver system having a radio receiver, a receiving antenna for receiving a desired signal by which the desired signal and the plurality of interfering signals are received, and a receive transmission line coupling the receiving antenna to the receiver, the radio receiver system being mounted on an aircraft having an outer skin, comprising:

an electrically conducting portion of the outer skin of the aircraft on which a composite sample signal is present, the composite sample signal corresponding to a composite of the plurality of interfering signals, the electrically conducting portion of the outer skin of the aircraft being different from the receiving antenna;

means coupled to the electrically conducting portion of the outer skin of the aircraft for sampling the composite sample signal present on the electrically conducting portion of the outer skin of the aircraft and for generating a reference signal corresponding to the composite sample signal;

a summer coupler coupled to the receive transmission line;

a sampler coupler coupled to the receive transmission line, the sampler coupler sampling the plurality of interfering signals and the desired signal received by the radio receiver system and generating an error signal corresponding to the plurality of interfering signals and the desired signal;

a synchronous detector, the synchronous detector being responsive to the reference signal and the error signal and generating a control signal in response to the reference signal and the error signal; and a signal controller, the signal controller being responsive to the reference signal and the control signal and generating a cancellation signal in response to the reference signal and the control signal, the cancellation signal being provided to the summer coupler, the summer coupler injecting the cancellation signal into the receive transmission line to cancel the plurality of interfering signals present in the radio receiver system.

2. An interference cancellation system as defined by claim 1, wherein the means coupled to the electrically conducting portion of the outer skin of the aircraft for sampling the composite sample signal includes an inductive coupler which inductively samples the composite sample signal present on the electrically conducting portion of the outer skin of the aircraft.

3. An interference cancellation system as defined by claim 1, wherein the means coupled to the electrically conducting portion of the outer skin of the aircraft for sampling the composite sample signal includes a reference signal sensor, the reference signal sensor having a first layer of an insulating material positioned adjacent to the electrically conducting portion of the outer skin of the aircraft, a thin foil loop situated adjacent to the first layer of insulating material, and a second layer of protective material situated adjacent to the foil loop, the second layer of protective material providing protection to the reference signal sensor from the environment.

4. A method for obtaining a reference signal for suppressing a plurality of interfering signals received by a radio receiver system mounted on an aircraft, the aircraft having an outer skin, at least a portion of the outer skin being electrically conducting, the radio receiver system having means for receiving a desired signal on which are present the desired signal and the plurality of interfering signals, comprising the steps of:

locating a portion of the electrically conducting outer skin portion of the aircraft on which a composite sample signal is present, the composite sample signal corresponding to a composite of the plurality of interfering signals, the portion of the electrically conducting outer skin portion of the aircraft being different from the means of the radio receiver system for receiving the desired signal;

sampling the composite sample signal present on the portion of the electrically conducting outer skin portion of the aircraft to obtain a reference signal corresponding to the composite sample signal; and providing the reference signal to an adaptive interference cancellation system and generating a cancellation signal to cancel the plurality of interfering signals received by the radio receiver system.

5. A method as defined by claim 4, wherein the step of sampling the composite sample signal present on the portion of the electrically conducting outer skin portion includes the step of inductively sampling the composite sample signal to obtain the reference signal.

* * * * *